March 3, 1964  W. W. BOSLER  3,123,801

EMERGENCY SIGNAL DEVICE

Filed April 16, 1962

INVENTOR
Warren W. Bosler

United States Patent Office 3,123,801
Patented Mar. 3, 1964

3,123,801
EMERGENCY SIGNAL DEVICE
Warren W. Bosler, 1623 SE. Insley, Portland, Oreg.
Filed Apr. 16, 1962, Ser. No. 187,856
2 Claims. (Cl. 340—52)

This invention relates generally to self actuated signalling devices, and more specifically to a device of this class particularly adapted for use in vehicles and other means of conveyance.

Vehicle accidents have often occurred under circumstances wherein no one witnesses the accident, with the result that the accident may remain a mystery for many hours or days. My invention is directed to an automatically triggered signalling device which is removably mounted in a vehicle for operation in response to an accident or conditions of extreme emergency. The device is designed to transmit a signal which may be readily pin pointed by police or other radios for rapid detection of the location of an accident or distress.

It is therefore a primary object of this invention to provide a signal device which may be triggered automatically in response to impact, water submersion, vehicle roll over, or manual operation.

It is a further object of this invention to provide an emergency signal device which may be simply constructed and inserted behind the fire wall of a vehicle or airplane for the purpose of guarding the safety of an operator in the event of an accident.

It is a still further object of this invention to provide an emergency signal device of the above class which may be manufactured economically for retail at reasonable cost, and may be simply removed for transportation and use in hunting trips and like remote excursions.

A full understanding of the details of the invention, together with further advantages, will become apparent by reference to the following detailed description of a preferred embodiment thereof, taken in conjunction with the attached drawings wherein.

Similar reference characters indicate corresponding parts throughout the several views in the drawing.

Figure 1:
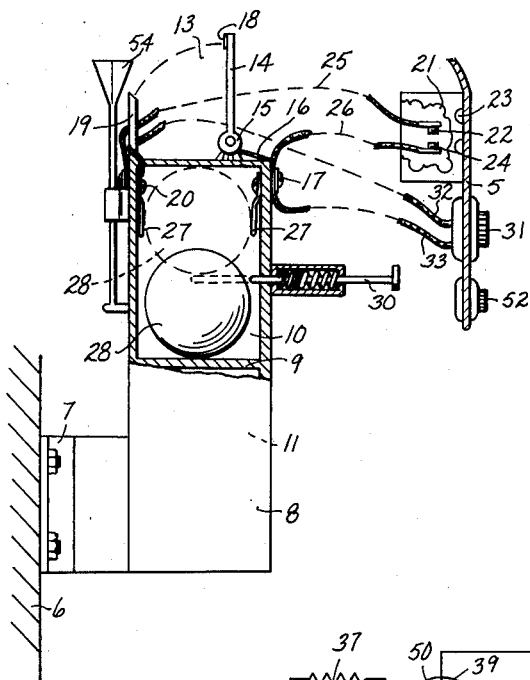
FIG. 1 is a cross sectional side elevation showing the trigger mechanism of my invention mounted to the framework or a motor block behind the dashboard of a vehicle.

Referring now to the drawings in detail, the numeral 5 represents the side panel of a vehicle dashboard. A motor block 6 and an angle bracket 7 provides a removable mounting for a small transmitter 8 consisting of a weatherproof container divided by a horizontal partition wall 9 into two compartments 10 and 11. The upper compartment 10 mounts the several trigger elements which may individually function to trip a relay 12 and initiate the operation of a transmitter 8 which is housed in the lower compartment 11.

An impact switch 13 comprises an arm 14 which is pivotally and frictionally mounted by an adjusting screw 15 to upstand from the top of the compartment 10. The switch pivot 15 is connected by a wire 16 to a common terminal 17, and the protruding end 18 of the arm 14 is adapted to engage with an upstanding terminal 19 in response to forward impact on behalf of the vehicle. The terminal 19 is connected to a common terminal 20 disposed within the compartment 10. The terminal 19 is preferably magnetic so as to retain the arm 14 when contacted thereby. A water gap switch 21 is mounted on the rearwardly facing side of the side panel 5 and comprises a perforated sleeve 23 which houses two spaced water sensing terminals 22 and 24. The water terminals are connected by wires 25 and 26 to the common terminals 17 and 20 respectively. Disposed on the inwardly facing sides of the compartment 10 are two leaf terminals 27 which are adapted to be closed by a ball bearing 28 normally disposed in the lower portion of the compartment 29. This switching device is operative in response to the overturn or inversion of a vehicle under which conditions the ball will drop into the position 28' and so close a circuit between the leaf terminals. Upon movement of the ball bearing into this position a spring loaded reset plunger 30 operates inwardly of the compartment so as to prevent the ball bearing from returning to its normal position in the event of the vehicle coming to rest on its wheels. A manual switch 31 is secured to protrude through the side panel 5 and is connected by wires 32 and 33 which communicate with the common terminals 17 and 20. A safety cutout switch 52 breaks the common terminal circuit to prevent accidental signal operation by children. Switches 31 and 52 are two stage safety switches.

Figure 2:
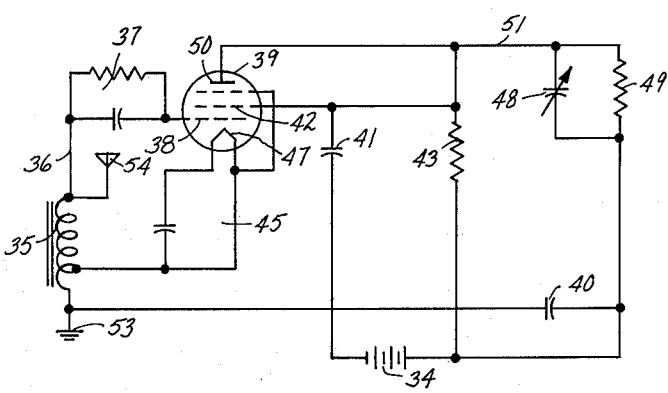
FIG. 2 is a circuit diagram of the wiring involved.
Figure 3:
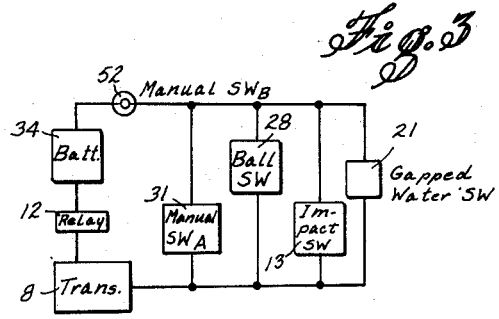
FIG. 3 is a schematic drawing showing the relationship of the several trigger elements which are connected in parallel with a small radio transmitter.

The above elements are connected in parallel with each other as indicated in FIG. 3, and the combinations are connected in series through a battery 34, the relay switch 12 and the transmitter 8. Referring to FIG. 2, of the drawings, the transmitter circuit involves a grid coil 35 suitably earthed at 53, which is connected by a wire 36 through a capacitor and resistor 37 to the grid 38 of a hard tube 39. The other end of the grid coil is connected through a capacitor 40 with the positive terminal of the vehicle battery 34. The other terminal of the battery 34 is connected through a crystal 41 with a grid 42 in the tube and also through a resistance 43 which again communicates with the positive terminal of the battery. A low tension circuit 45 energizes an element 47 disposed within the tube 39. A variable condenser 48 and inductance 49 are connected from the cathode 50 in the tube by a wire 51 and connect at their other end with the positive terminal of the battery 34. An antenna 54 is mounted on the side of the transmitter as indicated in FIG. 1 of the drawings.

The output of this transmitter is naturally dependent on the number of tubes incorporated in the circuit, and it will be appreciated that the circuit is operable on either six or twelve volts. In the event of an accident, the vehicle must be subject to conditions which will operate one or more of the above described switching devices, thereby ensuring that a distress signal is transmitted regardless of the condition of the operator of the vehicle. The transmitter has been constructed such that it may be simply removed from the vehicle, for use remote from the vehicle if so desired.

Having described the invention in a preferred form, it will be appreciated that some modifications may be made to the precise configuration, without departing from the scope or spirit of the invention, as defined by the following claims.

I claim:

1. An emergency signal device for vehicles comprising, in combination, a battery connected series with a relay switch and a transmitter, an automatic switch device operating the relay switch, said switch device comprising a compartment mounting an impact switch, an inversion switch and a manual switch, said switches being connected in parallel with each other for individual actuation of said relay switch, said inversion switch comprising a ball bearing disposed freely upon the floor of said compartment, leaf contacts disposed in an upper part of said compartment and adapted to be closed by said ball bearing upon inversion of said compartment, means for retaining said ball bearing in a closed position with said leaf contacts comprising a plunger slidably carried by a central portion of said compartment for movement transversely thereof into the path of movement of said ball bearnig, a spring yieldably urging said plunger inwardly of said compartment, said plunger abutting said ball bearing normally supported upon the floor of said compartment, and retractable outwardly upon inversion of said compartment and movement of said ball bearing into engagement with said leaf contacts, said plunger being spaced from said leaf contacts a distance corresponding to the diameter of said ball bearing whereby said plunger extends into said compartment to retain said ball bearing in engagement with said leaf contacts following movement of said ball bearing past said plunger during movement of said floor of said compartment into contact with said leaf contacts.

2. An emergency signal device according to claim 1, wherein said impact switch comprises an arm pivotally mounted to the top of the compartment in a frictional relationship, said arm adapted to be radially disposed to close a circuit and actuate the relay switch, and magnetic means for maintaining the impact switch closed when actuated by an impact.

References Cited in the file of this patent
UNITED STATES PATENTS

| | | |
|---|---|---|
| 1,241,888 | Safford | Oct. 2, 1917 |
| 1,816,939 | Stangler | Aug. 4, 1931 |
| 1,823,950 | Mechetti | Sept. 21, 1931 |
| 2,473,050 | Camp | June 14, 1949 |